US006938130B2

(12) United States Patent
Jacobson et al.

(10) Patent No.: US 6,938,130 B2
(45) Date of Patent: Aug. 30, 2005

(54) METHOD AND APPARATUS FOR DELAYING INTERFERING ACCESSES FROM OTHER THREADS DURING TRANSACTIONAL PROGRAM EXECUTION

(75) Inventors: Quinn A. Jacobson, Sunnyvale, CA (US); Marc Tremblay, Menlo Park, CA (US); Shailender Chaudhry, San Francisco, CA (US)

(73) Assignee: Sun Microsystems Inc., Santa Clara, CA (US)

( * ) Notice: Subject to any disclaimer, the term of this patent is extended or adjusted under 35 U.S.C. 154(b) by 10 days.

(21) Appl. No.: 10/737,679

(22) Filed: Dec. 15, 2003

(65) Prior Publication Data

US 2004/0162951 A1 Aug. 19, 2004

Related U.S. Application Data

(60) Provisional application No. 60/447,128, filed on Feb. 13, 2003.

(51) Int. Cl.[7] .............................. G06F 9/46; G06F 9/38
(52) U.S. Cl. ...................... 711/144; 711/145; 711/143; 711/150; 711/151; 711/156; 711/158; 711/130; 710/264; 710/263; 710/261; 710/240; 710/244; 718/102
(58) Field of Search ................. 711/143–145, 150–152, 711/156, 158, 130; 710/240, 244, 260, 261, 263, 264; 707/8, 201; 713/400; 712/216, 218, 228; 718/102, 103

(56) References Cited

U.S. PATENT DOCUMENTS

| | | | | |
|---|---|---|---|---|
| 5,940,827 A | * | 8/1999 | Hapner et al. ................. | 707/8 |
| 6,360,220 B1 | * | 3/2002 | Forin ............................. | 707/8 |
| 6,578,033 B1 | * | 6/2003 | Singhal et al. ................ | 707/8 |
| 2003/0066056 A1 | * | 4/2003 | Peterson et al. ............ | 717/137 |
| 2003/0079094 A1 | * | 4/2003 | Rajwar et al ................ | 711/150 |
| 2004/0162948 A1 | * | 8/2004 | Tremblay et al. ........... | 711/137 |
| 2004/0186970 A1 | * | 9/2004 | Kekre et al. ................. | 711/162 |

OTHER PUBLICATIONS

Multi–view memory to support OS locking for transaction systems, Bodorik, P.; Jutla, D.N.; Database Engineering and Applications Symposium, 1997. IDEAS '97. Proceedings., International, Aug 25–27 1997, pp.: 309–318.*

Indexing for multiversion locking: alternative and performance evaluation, Bober, P.M.; Carey, M.J.; Knowledge and Data Engineering, IEEE Transaction on , vol.: 9, Issue: 1, Jan.–Feb. 1997, pp.: 68–84.*

Transactional execution: toward reliable, high–performance multithreading, Rajwar, R.; Goodman, J.; Micro, IEEE, vol.: 23, Issue: 6, Nov.–Dec. 2003, pp.: 117–125.*

Checkpoint processing and recovery: an efficient, scalable alternative to reorder buffers, Akkary, H.; Rajwar, R.; Srinivasan, S.T.; Micro, IEEE vol.: 23, Issue: 6, Nov.–Dec. 2003, pp.: 11–19.*

(Continued)

*Primary Examiner*—Hong Kim
(74) *Attorney, Agent, or Firm*—Park, Vaughan & Fleming LLP

(57) ABSTRACT

One embodiment of the present invention provides a system that facilitates delaying interfering memory accesses from other threads during transactional execution. During transactional execution of a block of instructions, the system receives a request from another thread (or processor) to perform a memory access involving a cache line. If performing the memory access on the cache line will interfere with the transactional execution and if it is possible to delay the memory access, the system delays the memory access and stores copy-back information for the cache line to enable the cache line to be copied back to the requesting thread. At a later time, when the memory access will no longer interfere with the transactional execution, the system performs the memory access and copies the cache line back to the requesting thread.

25 Claims, 9 Drawing Sheets

OTHER PUBLICATIONS

Speculative lock elision: enabling highly concurrent multi-threaded execution, Rajwar, R.; Goodman, J.R.; Microarchitecture, 2001. MICRO–34. Proceedings. 34th ACM/IEEE International Symposium on, Dec. 1–5 2001, pp.: 294–305.*

Checkpoint processing and recovery: towards scalable large instruction window processors, Akkary, H.; Rajwar, R.; Srinivasan S.T.; Microarchitecture, 2003. MICRO–36. Proceedings. 36th Annual IEEE/ACM International Symposium on, Dec. 3–5 2003, p 423–434.*

Improving the throughtput of synchronization by insertion of delays, Rajwar, R.; Kagi, A.; Goodman, J.R.; High–Performance Computer Architecture, 2000. HPCA–6. Proceedings. Sixth International Symposium on Jan. 8–12 2000, pp.: 168–179.*

Rajwar R: "Speculation–Based Techniques for Transactional Lock–Free Execution of Lock–Based Programs" 'Online! 2002, XP002286237, Retrieved from the Internet: URL:http://bbcr.uwaterloo.ca/{brecht/courses/856/readings-new/rajwar02speculationsbased.pdf> 'retrieved on Jun. 25, 2004!.

Stone J M et al: "Multiple reservations and the Oklahoma update" IEEE Parallel Distrib. Technol., Syst. Appl. (USA), IEEE Parallel & Distributed Technology: Systems & Applications, Nov. 1993, USA, vol. 1, No. 4, Nov. 1993 pp. 58–71 XP002286236 ISSN: 1063–6552.

* cited by examiner

OLD VERSION          NEW VERSION

⋮                    ⋮

ACQUIRE LOCK         STE       <FAIL PC>

⋮                    ⋮

CRITICAL      CRITICAL
SECTION                            SECTION

⋮                    ⋮

RELEASE LOCK         COMMIT

⋮                    ⋮

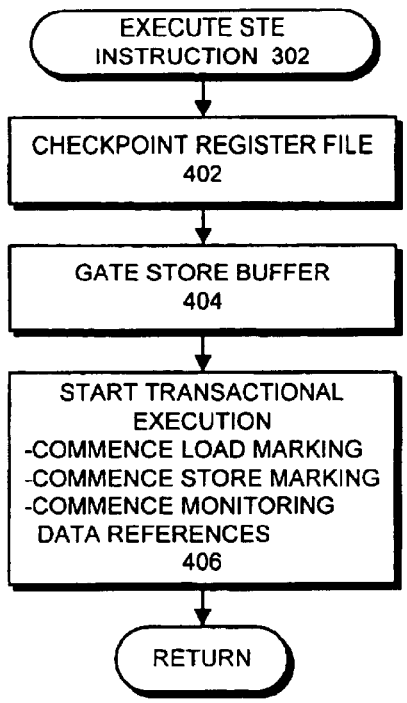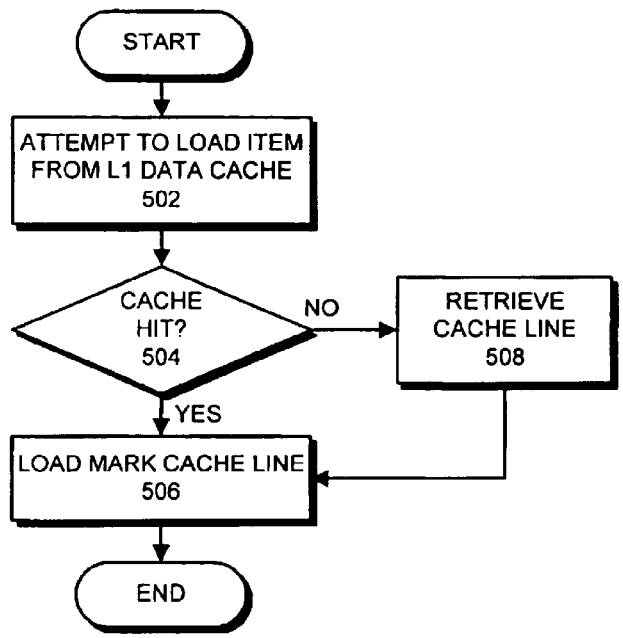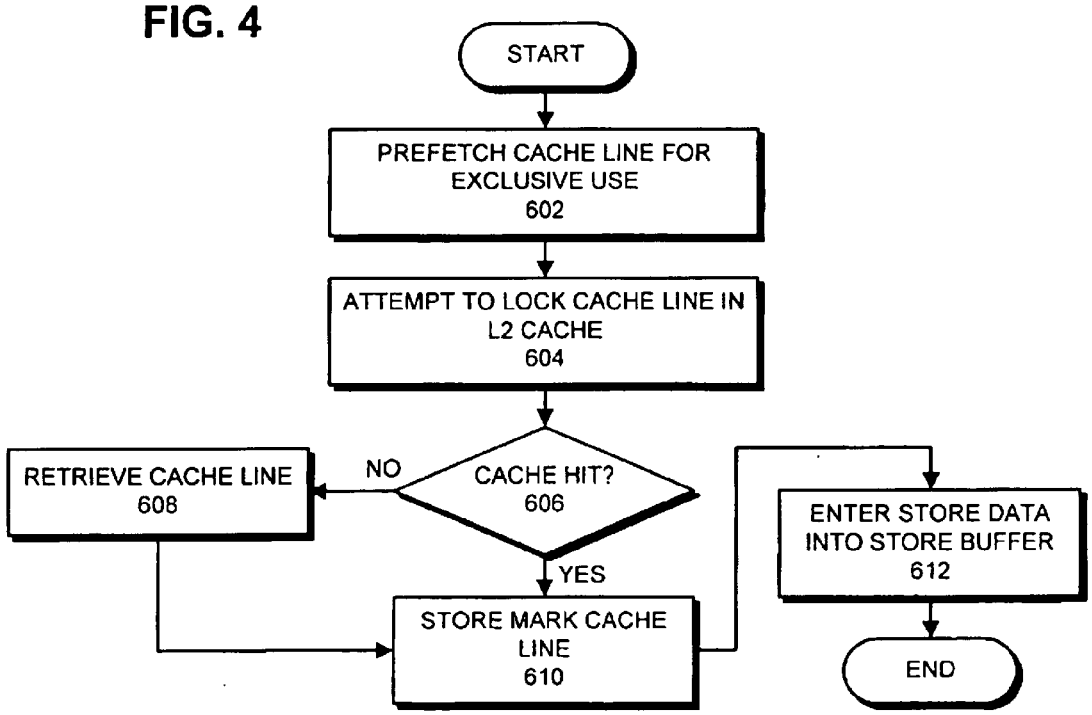
FIG. 4
FIG. 5
FIG. 6

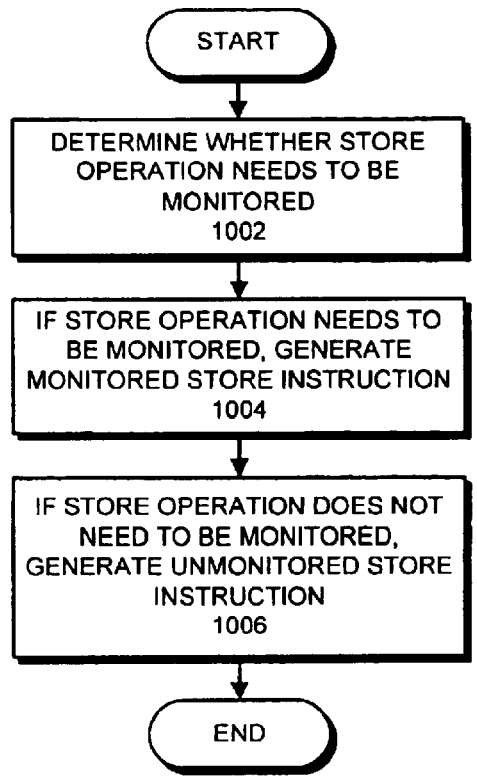 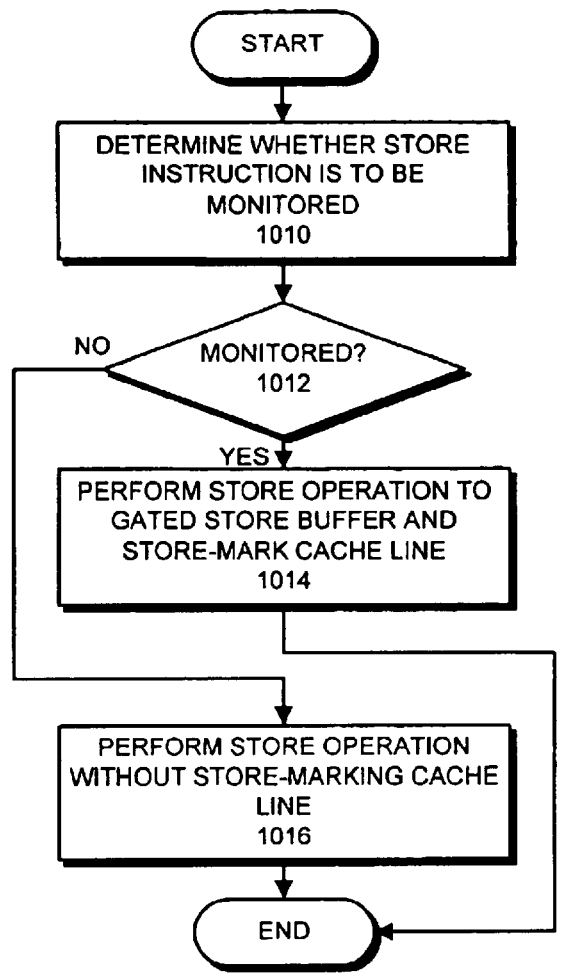
FIG. 10A
FIG. 10B

METHOD AND APPARATUS FOR DELAYING INTERFERING ACCESSES FROM OTHER THREADS DURING TRANSACTIONAL PROGRAM EXECUTION

RELATED APPLICATION

This application hereby claims priority under 35 U.S.C. §119 to U.S. Provisional Patent Application No. 60/447,128, filed on 13 Feb. 2003, entitled "Transactional Memory," by inventors Shailender Chaudhry, Marc Tremblay and Quinn Jacobson.

BACKGROUND

1. Field of the Invention

The present invention relates to techniques for improving the performance of computer systems. More specifically, the present invention relates to a method and an apparatus for delaying memory accesses from other threads that interfere with on-going transactional program execution.

2. Related Art

Computer system designers are presently developing mechanisms to support multi-threading within the latest generation of Chip-Multiprocessors (CMPs) as well as more traditional Shared Memory Multiprocessors (SMPs). With proper hardware support, multi-threading can dramatically increase the performance of numerous applications. However, as microprocessor performance continues to increase, the time spent synchronizing between threads (processes) is becoming a large fraction of overall execution time. In fact, as multi-threaded applications begin to use even more threads, this synchronization overhead becomes the dominant factor in limiting application performance.

From a programmer's perspective, synchronization is generally accomplished through the use locks. A lock is typically acquired before a thread enters a critical section of code, and is released after the thread exits the critical section. If another thread wants to enter the same critical section, it must acquire the same lock. If it is unable to acquire the lock, because a preceding thread has grabbed the lock, the thread must wait until the preceding thread releases the lock. (Note that a lock can be implemented in a number of ways, such as through atomic operations or semaphores.)

Unfortunately, the process of acquiring a lock and the process of releasing a lock are very time-consuming in modern microprocessors. They involve atomic operations, which typically flush the load buffer and store buffer, and can consequently require hundreds, if not thousands, of processor cycles to complete.

Moreover, as multi-threaded applications use more threads, more locks are required. For example, if multiple threads need to access a shared data structure, it is impractical for performance reasons to use a single lock for the entire data structure. Instead, it is preferable to use multiple fine-grained locks to lock small portions of the data structure. This allows multiple threads to operate on different portions of the data structure in parallel. However, it also requires a single thread to acquire and release multiple locks in order to access different portions of the data structure.

In some cases, locks are used when they are not required. For example, many applications make use of "thread-safe" library routines that use locks to ensure that they are "thread-safe" for multi-threaded applications. Unfortunately, the overhead involved in acquiring and releasing these locks is still incurred, even when the thread-safe library routines are called by a single-threaded application.

Applications typically use locks to ensure mutual exclusion within critical sections of code. However, in many cases threads will not interfere with each other, even if they are allowed to execute a critical section simultaneously. In these cases, mutual exclusion is used to prevent the unlikely case in which threads actually interfere with each other. Consequently, in these cases, the overhead involved in acquiring and releasing locks is largely wasted.

Hence, what is needed is a method and an apparatus that reduces the overhead involved in manipulating locks when accessing critical sections.

One technique to reduce the overhead involved in manipulating locks is to "transactionally" execute a critical section, wherein changes made during the transactional execution are not committed to the architectural state of the processor until the transactional execution successfully completes. This technique is described in related U.S. patent application Ser. No. 10/637,168, entitled, "Selectively Monitoring Loads to Support Transactional Program Execution," by inventors Marc Tremblay, Quinn A. Jacobson and Shailender Chaudhry, filed on 8 Aug. 2003.

During transactional execution, load and store operations are modified so that they mark cache lines that are accessed during the transactional execution. This allows the computer system to determine if an interfering data access occurs during the transactional execution. If so, the transactional execution fails, and results of the transactional execution are not committed to the architectural state of the processor. One the other hand, if the transactional execution successfully executes a block of instructions, results of the transactional execution are atomically committed to the architectural state of the processor.

Unfortunately, this commit operation does not happen instantaneously. During the commit operation, stores that took place during transactional execution must somehow be committed to the architectural state of the processor. Note that there can potentially be a large number of stores, so committing these stores can take a significant amount of time. While the stores are being committed, an interfering data access from another thread can potentially occur. However, failing the transactional execution to deal with this type of interfering data access during the commit operation is not a viable option, because doing so can leave the processor in an inconsistent state, with only a portion of the transactional updates committed.

Hence, what is needed is a method and an apparatus for preventing accesses from other threads from interfering with transactional program execution, and in particular that prevents accesses from other threads from interfering with a commit operation that takes place at the end of transactional program execution.

SUMMARY

One embodiment of the present invention provides a system that facilitates delaying interfering memory accesses from other threads during transactional execution. During transactional execution of a block of instructions, the system receives a request from another thread (or processor) to perform a memory access involving a cache line. If performing the memory access on the cache line will interfere with the transactional execution and if it is possible to delay the memory access, the system delays the memory access and stores copy-back information for the cache line to enable the cache line to be copied back to the requesting thread. At a later time, when the memory access will no longer interfere with the transactional execution, the system performs the memory access and copies the cache line back to the requesting thread.

In a variation on this embodiment, it is possible to delay an interfering memory access if a commit operation is in the process of committing updates made during the transactional execution to the architectural state of the processor, and if the memory access is directed to a cache line for which a last update made during the transactional execution has not yet been committed to the architectural state of the processor.

In a further variation, a cache line associated with a delayed memory access is copied back to the requesting thread after the last update to the cache line during the transactional execution is committed to the architectural state of the processor.

In a variation on this embodiment, the cache line associated with a delayed memory access is copied back to the requesting thread after all updates that took place during the transactional execution are committed to the architectural state of the processor.

In a variation on this embodiment, it is possible to delay an interfering memory access prior to the commit operation. In this case, if the transactional execution fails prior to the commit operation, the system copies back cache lines for any interfering memory accesses that have been delayed during the transactional execution, wherein the data that is copied back is original cache line data, which has not been modified during the transactional execution.

In a variation on this embodiment, if the memory access will interfere with the transactional execution and if it is not possible to delay the memory access, the system discards changes made during the transactional execution. The system also allows the memory access to complete and attempts to re-execute the block of instructions.

In a further variation, discarding changes made during transactional execution involves: discarding register file changes made during the transactional execution; clearing load marks from cache lines; draining store buffer entries generated during the transactional execution; and clearing store marks from cache lines.

In a variation on this embodiment, an interfering memory access can include: a store by another thread to a cache line that has been load-marked by the thread; and a load or a store by another thread to a cache line that has been store-marked by the thread.

In a variation on this embodiment, commencing transactional execution involves: saving processor registers; configuring the processor to load-mark cache lines during loads that take place during transactional execution; configuring the processor to store-mark cache lines during stores that take place during transactional execution; and configuring the processor to continually monitor data references from other threads to detect interfering data references.

In a variation on this embodiment, if transactional execution completes without encountering an interfering memory access from another thread, the system commits changes made during the transactional execution to the architectural state of the processor, and resumes normal non-transactional execution of the program past the block of instructions.

In a further variation, committing changes made during transactional execution involves: clearing load marks from cache lines; committing register file changes made during transactional execution; and committing store buffer entries generated during the transactional execution to memory. Note that if a store buffer entry contains a last update made to a cache line made during the transactional execution, committing the store buffer entry can involve unmarking the corresponding cache line.

In a variation on this embodiment, the request to perform the memory access can include a request-to-own (RTO) signal or a request-to-share (RTS) signal.

BRIEF DESCRIPTION OF THE FIGURES

FIG. 4 presents a flow chart illustrating a start transactional execution (STE) operation in accordance with an embodiment of the present invention.

FIG. 5 presents a flow chart illustrating how load-marking is performed during transactional execution in accordance with an embodiment of the present invention.

FIG. 6 presents a flow chart illustrating how store-marking is performed during transactional execution in accordance with an embodiment of the present invention.

FIG. 10A presents a flow chart illustrating how monitored and unmonitored store instructions are generated in accordance with an embodiment of the present invention.

FIG. 10B presents a flow chart illustrating how monitored and unmonitored store instructions are executed in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
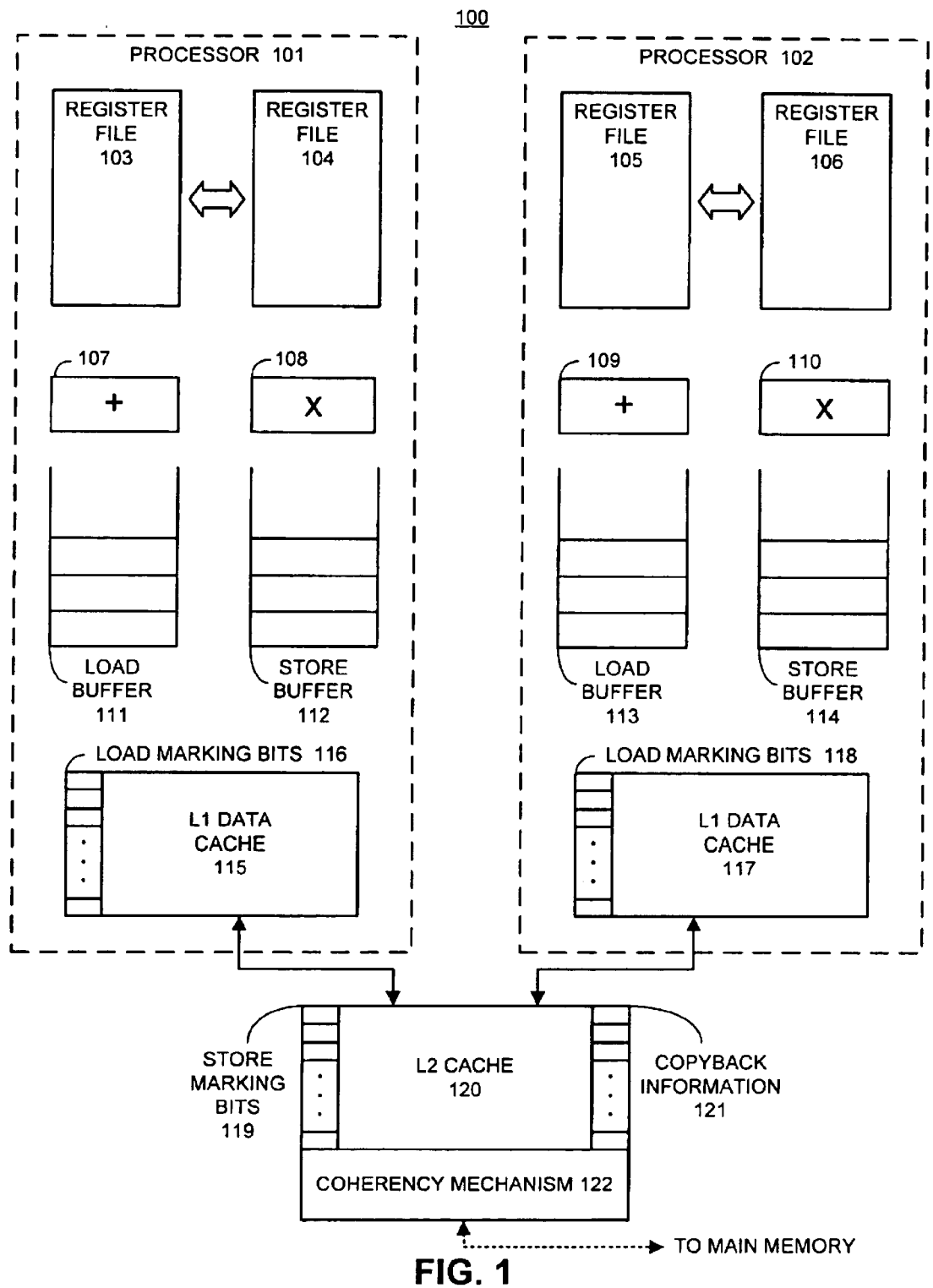
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance. As is illustrated in FIG. 1, computer system 100 includes processors 101 and level 2 (L2) cache 120, which is coupled to main memory (not shown). Processor 102 is similar in structure to processor 101, so only processor 101 is described below.

Processor 101 has two register files 103 and 104, one of which is an "active register file" and the other of which is a backup "shadow register file." In one embodiment of the present invention, processor 101 provides a flash copy operation that instantly copies all of the values from register file 103 into register file 104. This facilitates a rapid register checkpointing operation to support transactional execution.

Processor 101 also includes one or more functional units, such as adder 107 and multiplier 108. These functional units are used in performing computational operations involving operands retrieved from register files 103 or 104. As in a conventional processor, load and store operations pass through load buffer 111 and store buffer 112.

Processor 101 additionally includes a level one (L1) data cache 115, which stores data items that are likely to be used by processor 101. Note that each line in L1 data cache 115 includes a "load-marking bit," which indicates that a data value from the line has been loaded during transactional execution. This load-marking bit is used to determine whether any interfering memory references take place during transactional execution as is described below with reference to FIGS. 3–8. Processor 101 also includes an L1 instruction cache (not shown).

Note that load-marking does not necessarily have to take place in L1 data cache 115. In general load-marking can take place at any level cache, such as L2 cache 120, or even in an independent structure. However, for performance reasons, the load-marking will likely take place at the cache level that is as close to the processor as possible, which in this case is L1 data cache 115. Otherwise, loads would have to go to L2 cache 120 even on an L1 hit.

L2 cache 120 operates in concert with L1 data cache 115 (and a corresponding L1 instruction cache) in processor 101, and with L1 data cache 117 (and a corresponding L1 instruction cache) in processor 102. Note that L2 cache 120 is associated with a coherency mechanism 122, such as the reverse directory structure described in U.S. patent application Ser. No. 10/186,118, entitled, "Method and Apparatus for Facilitating Speculative Loads in a Multiprocessor System," filed on Jun. 26, 2002, by inventors Shailender Chaudhry and Marc Tremblay (Publication No. US-2002-0199066-A1). This coherency mechanism 122 maintains "copyback information" 121 for each cache line. This copyback information 121 facilitates sending a cache line from L2 cache 120 to a requesting processor in cases where a cache line must be sent to another processor.

Each line in L2 cache 120 includes a "store-marking bit," which indicates that a data value has been stored to the line during transactional execution. This store-marking bit is used to determine whether any interfering memory references take place during transactional execution as is described below with reference to FIGS. 3–8. Note that store-marking does not necessarily have to take place in L2 cache 120.

Ideally, the store-marking takes place in the cache level closest to the processor where cache lines are coherent. For write-through L1 data caches, writes are automatically propagated to L2 cache 120. However, if an L1 data cache is a write-back cache, we perform store-marking in the L1 data cache. (Note that the cache coherence protocol ensures that any other processor that subsequently modifies the same cache line will retrieve the cache line from the L1 cache, and will hence become aware of the store-mark.)

Executing a Critical Section

Figure 2:
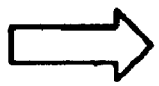
FIG. 2 illustrates how a critical section is executed in accordance with an embodiment of the present invention.

FIG. 2 illustrates how a critical section is executed in accordance with an embodiment of the present invention. As is illustrated in the left-hand side of FIG. 2, a thread that executes a critical section typically acquires a lock associated with the critical section before entering the critical section. If the lock has been acquired by another thread, the thread may have to wait until the other thread releases the lock. Upon leaving the critical section, the thread releases the lock. (Note that the terms "thread" and "process" are used interchangeably throughout this specification.)

A lock can be associated with a shared data structure. For example, before accessing a shared data structure, a thread can acquire a lock on the shared data structure. The thread can then execute a critical section of code that accesses the shared data structure. After the thread is finished accessing the shared data structure, the thread releases the lock.

In contrast, in the present invention, the thread does not acquire a lock, but instead executes a start transactional execution (STE) instruction before entering the critical section. If the critical section is successfully completed without interference from other threads, the thread performs a commit operation, to commit changes made during transactional execution. This sequence of events is described in more detail below with reference to FIGS. 3–8.

Note that in one embodiment of the present invention a compiler replaces lock-acquiring instructions with STE instructions, and also replaces corresponding lock releasing instructions with commit instructions. (Note that there may not be a one-to-one correspondence between replaced instructions. For example, a single lock acquisition operation comprised of multiple instructions may be replaced by a single STE instruction.) The above discussion presumes that the processor's instruction set has been augmented to include an STE instruction and a commit instruction. These instructions are described in more detail below with reference to FIGS. 3–9.

Transactional Execution Process

Figure 3:
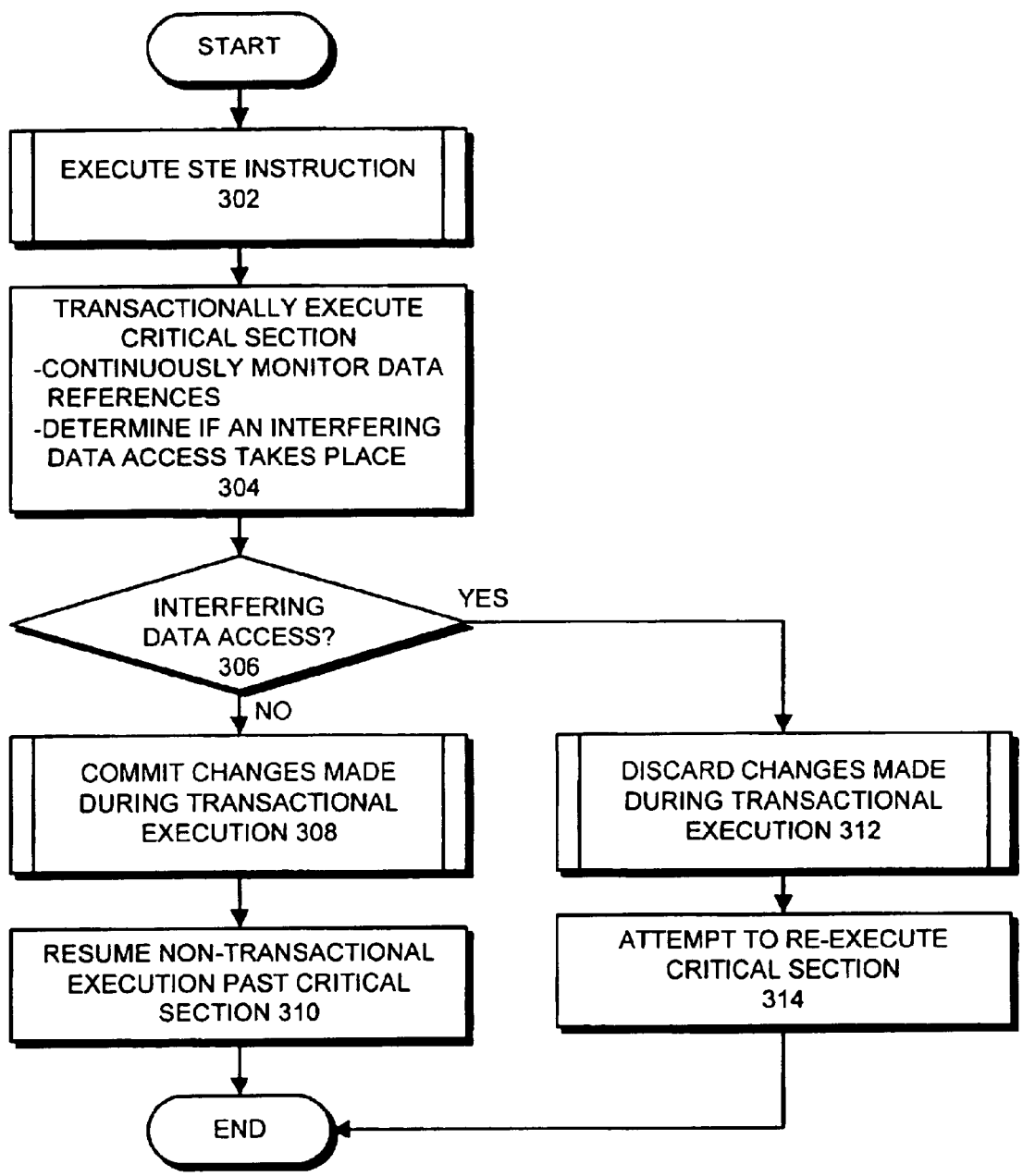
FIG. 3 presents a flow chart illustrating the transactional execution process in accordance with an embodiment of the present invention.

FIG. 3 presents a flow chart illustrating how transactional execution takes place in accordance with an embodiment of the present invention. A thread first executes an STE instruction prior to entering of a critical section of code (step 302). Next, the system transactionally executes code within the critical section, without committing results of the transactional execution (step 304).

During this transactional execution, the system continually monitors data references made by other threads, and determines if an interfering data access (or other type of failure) takes place during transactional execution. If not, the system atomically commits all changes made during transactional execution (step 308) and then resumes normal non-transactional execution of the program past the critical section (step 310).

On the other hand, if an interfering data access is detected, the system discards changes made during the transactional execution (step 312), and attempts to re-execute the critical section (step 314).

In one embodiment of the present invention, the system attempts the transactionally re-execute the critical section zero, one, two or more times. If these attempts are not successful, the system executes an alternative block of code in normal execution mode. This alternative code may perform additional attempts to perform the transaction and will likely have the ability to reverts back to the conventional technique of acquiring a lock on the critical section before entering the critical section, and then releasing the lock after leaving the critical section.

Note that an interfering data access can include a store by another thread to a cache line that has been load-marked by the thread. It can also include a load or a store by another thread to a cache line that has been store-marked by the thread.

Also note that circuitry to detect interfering data accesses can be easily implemented by making minor modifications to conventional cache coherence circuitry. This conventional cache coherence circuitry presently generates signals indicating whether a given cache line has been accessed by another processor. Hence, these signals can be used to determine whether an interfering data access has taken place.

Starting Transactional Execution

FIG. 4 presents a flow chart illustrating a start transactional execution (STE) operation in accordance with an embodiment of the present invention. This flow chart illustrates what takes place during step 302 of the flow chart in FIG. 3. The system starts by checkpointing the register file (step 402). This can involve performing a flash copy operation from register file 103 to register file 104 (see FIG. 1). In addition to checkpointing register values, this flash copy can also checkpoint various state registers associated with the currently executing thread. In general, the flash copy operation checkpoints enough state to be able to restart the corresponding thread.

At the same time the register file is checkpointed, the STE operation also causes store buffer 112 to become "gated" (step 404). This allows existing entries in store buffer to propagate to the memory sub-system, but prevents new store buffer entries generated during transactional execution from doing so.

The system then starts transactional execution (step 406), which involves load-marking and store-marking cache lines, if necessary, as well as monitoring data references in order to detect interfering references.

Load-Marking Process

FIG. 5 presents a flow chart illustrating how load-marking is performed during transactional execution in accordance with an embodiment of the present invention. During transactional execution of a critical section, the system performs a load operation. In performing this load operation if the load operation has been identified as a load operation that needs to be load-marked, system first attempts to load a data item from L1 data cache 115 (step 502). If the load causes a cache hit, the system "load-marks" the corresponding cache line in L1 data cache 115 (step 506). This involves setting the load-marking bit for the cache line. Otherwise, if the load causes a cache miss, the system retrieves the cache line from further levels of the memory hierarchy (step 508), and proceeds to step 506 to load-mark the cache line in L1 data cache 115.

Store-Marking Process

FIG. 6 presents a flow chart illustrating how store-marking is performed during transactional execution in accordance with an embodiment of the present invention. During transactional execution of a critical section, the system performs a store operation. If this store operation has been identified as a store operation that needs to be store-marked, the system first prefetches a corresponding cache line for exclusive use (step 602). Note that this prefetch operation will do nothing if the line is already located in cache and is already in an exclusive use state.

Since in this example L1 data cache 115 is a write-through cache, the store operation propagates through L1 data cache 115 to L2 cache 120. The system then attempts to lock the cache line corresponding to the store operation in L2 data cache 115 (step 604). If the corresponding line is in L2 cache 120 (cache hit), the system "store-marks" the corresponding cache line in L2 cache 120 (step 610). This involves setting the store-marking bit for the cache line. Otherwise, if the corresponding line is not in L2 cache 120 (cache miss), the system retrieves the cache line from further levels of the memory hierarchy (step 608) and then proceeds to step 610 to store-mark the cache line in L2 cache 120.

Next, after the cache line is store-marked in step 610, the system enters the store data into an entry of the store buffer 112 (step 612). Note that this store data will remain in store buffer 112 until a subsequent commit operation takes place, or until changes made during the transactional execution are discarded.

Note that a cache line that is store marked by a given thread can be read by other threads. Note that this may cause the given thread to fail while the other threads continue.

Commit Operation

Figure 7:
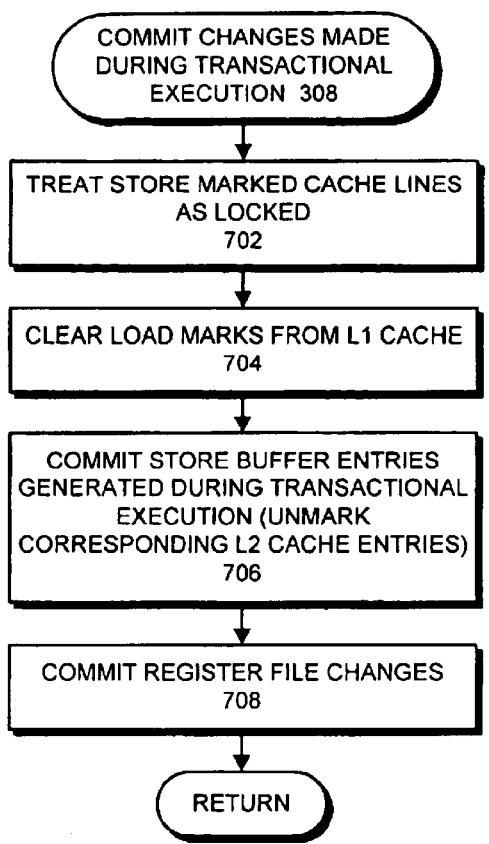
FIG. 7 presents a flow chart illustrating how a commit operation is performed in accordance with an embodiment of the present invention.

FIG. 7 presents a flow chart illustrating how a commit operation is performed after transactional execution completes successfully in accordance with an embodiment of the present invention. This flow chart illustrates what takes place during step 308 of the flow chart in FIG. 3.

The system starts by treating store-marked cache lines as though they are locked (step 702). This means other threads that request a store-marked line must wait until the line is no longer locked before they can access the line. This is similar to how lines are locked in conventional caches.

Next, the system clears load-marks from L1 data cache 115 (step 704).

The system then commits entries from store buffer 112 for stores that are identified as needing to be marked, which were generated during the transactional execution, into the memory hierarchy (step 706). As each entry is committed, a corresponding line in L2 cache 120 is unlocked.

The system also commits register file changes (step 708). For example, this can involve functionally performing a flash copy between register file 103 and register file 104 in the system illustrated in FIG. 1.

Discarding Changes

Figure 8:
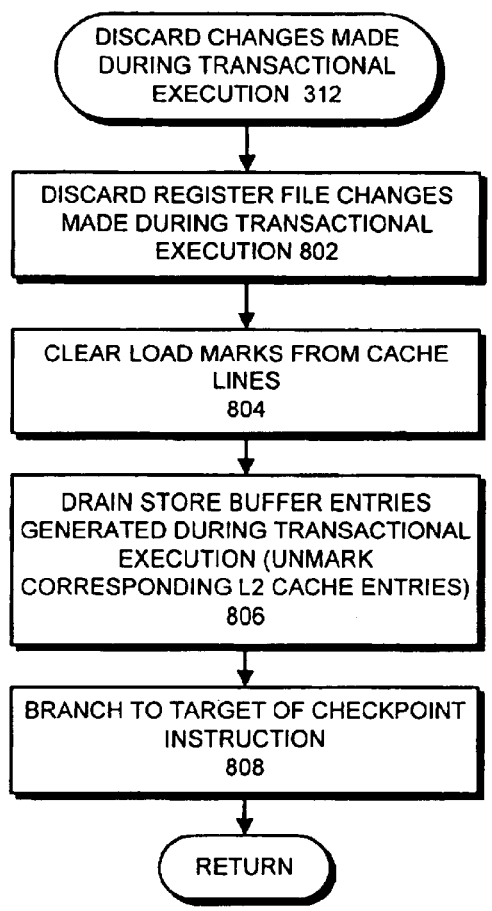
FIG. 8 presents a flow chart illustrating how changes are discarded after transactional execution completes unsuccessfully in accordance with an embodiment of the present invention.

FIG. 8 presents a flow chart illustrating how changes are discarded after transactional execution completes unsuccessfully in accordance with an embodiment of the present invention. This flow chart illustrates what takes place during step 312 of the flow chart in FIG. 3. The system first discards register file changes made during the transactional execution (step 802). This can involve either clearing or simply ignoring register file changes made during transactional execution. This is easy to accomplish because the old register values were checkpointed prior to commencing transactional execution. The system also clears load-marks from cache lines in L1 data cache 115 (step 804), and drains store buffer entries generated during transactional execution without committing them to the memory hierarchy (step 806). At the same time, the system unmarks corresponding L2 cache lines. Finally, in one embodiment of the present invention, the system branches to a target location specified by the STE instruction (step 808). The code at this target location attempts to re-execute the critical section as is described above with reference to step 314 of FIG. 1.

Monitored Load Instructions

Figure 9A:
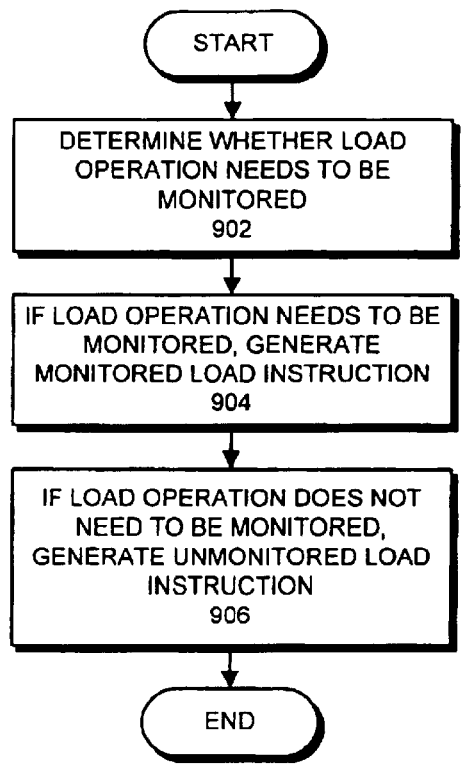
FIG. 9A presents a flow chart illustrating how monitored and unmonitored load instructions are generated in accordance with an embodiment of the present invention.

FIG. 9A presents a flow chart illustrating how monitored and unmonitored load instructions are generated in accordance with an embodiment of the present invention. This process takes place when a program is being generated to support transactional execution. For example, in one embodiment of the present invention, a compiler or virtual machine automatically generates native code to support transactional execution. In another embodiment, a programmer manually generates code to support transactional execution.

The system first determines whether a given load operation within a block of instructions to be transactionally executed needs to be monitored (step 902). In one embodiment of the present invention, the system determines whether a load operation needs to be monitored by determining whether the load operation is directed to a heap. Note that a heap contains data that can potentially be accessed by other threads. Hence, loads from the heap need to be monitored to detect interference. In contrast, loads from outside the heap, (for example, from the local stack) are not directed to data that is shared by other threads, and hence do not need to be monitored to detect interference.

One embodiment of the present invention determines whether a load operation needs to be monitored at the programming-language level, by examining a data structure associated with the load operation to determine whether the data structure is a "protected" data structure for which loads need to be monitored, or an "unprotected" data structure for which loads do not need to be monitored.

In yet another embodiment, the system allows a programmer to determine whether a load operation needs to be monitored.

If the system determines that a given load operation needs to be monitored, the system generates a "monitored load" instruction (step 904). Otherwise, the system generates an "unmonitored load" instruction (step 906).

There are a number of different ways to differentiate a monitored load instruction from an unmonitored load instruction. (1) The system can use the op code to differentiate a monitored load instruction from an unmonitored load instruction. (2) Alternatively, the system can use the address of the load instruction to differentiate between the two types of instructions. For example, loads directed to a certain range of addresses can be monitored load instructions, whereas loads directed to other address can be unmonitored load instructions.

Also note that an unmonitored load instruction can either indicate that no other thread can possibly interfere with the load operation, or it can indicate that interference is possible, but it is not a reason to fail. (Note that in some situations, interfering accesses to shared data can be tolerated.)

Figure 9B:
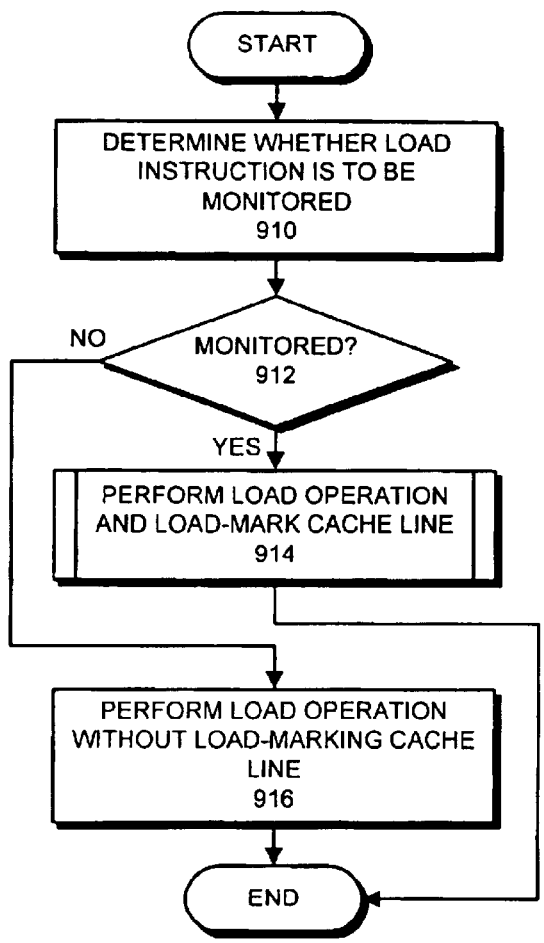
FIG. 9B presents a flow chart illustrating how monitored and unmonitored load instructions are executed in accordance with an embodiment of the present invention.

FIG. 9B presents a flow chart illustrating how monitored and unmonitored load instructions are executed in accordance with an embodiment of the present invention. The system first determines whether the load instruction is a monitored load instruction or an unmonitored load instruction (step 910). This can be accomplished by looking at the op code of the load instruction, or alternatively, looking at the address for the load instruction. Note that the address can be examined by comparing the address against boundary registers, or possibly examining a translation lookaside buffer (TLB) entry fro the address to determine if the address falls within a monitored range of addresses.

If the load instruction is a monitored load instruction, the system performs the corresponding load operation and load marks the associated cache line (step 914). Otherwise, if the load instruction is an unmonitored load instruction, the system performs the load operation without load-marking the cache line (step 916).

In a variant of the embodiment of the present invention, the system does not allow an unmarked load operation from the current thread cause other threads to fail transactional execution. This can be accomplished by propagating additional information during the coherency transactions associated with the load operation to ensure that the load operation does not cause another thread to fail.

Monitored Store Instructions

FIG. 10A presents a flow chart illustrating how monitored and unmonitored store instructions are generated in accordance with an embodiment of the present invention. As was described above for load operations, this process can take place when a compiler or virtual machine automatically generates native code to support transactional execution, or when a programmer manually generates code to support transactional execution.

The system first determines whether a store operation within a block of instructions to be transactionally executed needs to be monitored (step 1002). This determination can be made in the based on the same factors as for load instructions.

If the system determines that a store operation needs to be monitored, the system generates a "monitored store" instruction (step 1004). Otherwise, the system generates an "unmonitored store" instruction (step 1006).

Note that monitored store instructions can be differentiated from unmonitored store instructions in the same way that monitored load instructions can be differentiated from unmonitored load instructions, for example the system can use different op codes or different address ranges.

FIG. 10B presents a flow chart illustrating how monitored and unmonitored store instructions are executed in accordance with an embodiment of the present invention. The system first determines whether the store instruction is a monitored store instruction or an unmonitored store instruction (step 1010). This can be accomplished by looking at the op code for the store instruction, or alternatively, looking at the address for the store instruction. If the store instruction is a monitored store instruction, the system performs the corresponding store operation to a gated store buffer, or in another way so that it can be later undone, and store marks the associated cache line (step 1014). Otherwise, if the store instruction is an unmonitored store instruction, the system performs the store operation without store-marking the cache line (step 1016).

Note that a store-marked cache line can indicate one or more of the following: (1) loads from other threads to the cache line should be monitored; (2) stores from other threads to the cache line should be monitored; or (3) stores to the cache line should be buffered until the transactional execution completes.

In a variant of the embodiment of the present invention, the system does not allow an unmarked store operation from the current thread cause another thread to fail transactional execution. This can be accomplished by propagating additional information during coherency transactions associated with the store operation to ensure that the store operation does not cause another thread to fail.

Delaying Interfering Accesses

Figure 11:
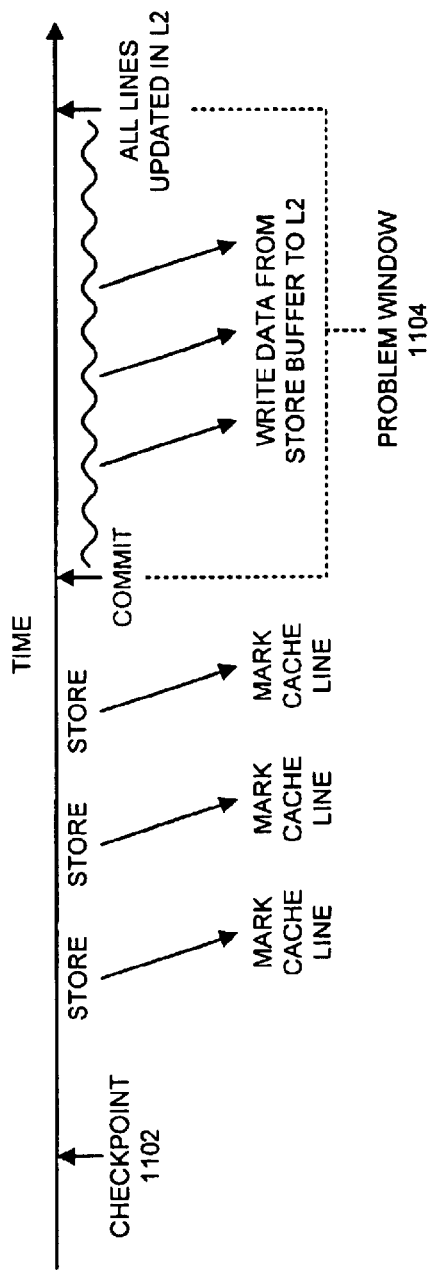
FIG. 11 presents a timeline illustrating transactional program execution in accordance with an embodiment of the present invention.

FIG. 11 presents a timeline illustrating transactional program execution in accordance with an embodiment of the present invention. At the beginning of transactional program execution, a checkpoint operation 1102 takes place. This enables the system to return to the checkpoint if a failure subsequently occurs during transactional execution. During transactional execution, a number of load and store operations are performed, which cause corresponding cache lines to be marked. (Note that only the store operations are illustrated in FIG. 11.) At the end of transactional execution, a commit operation takes place, which commits changes made during the speculative execution to the architectural state of the processor. In one embodiment of the present invention, this involves committing entries from a store buffer into the L2 cache. Finally, after all changes made during the transactional execution are committed to the architectural state of the processor, the commit operation is complete, and normal, non-speculative program execution resumes.

Note that during a problem window 1104 results of the transactional execution are being committed to the architectural state of the processor. During this problem window, interfering accesses from other threads can potentially occur. However, failing transactional execution within problem window 1104 to deal with an interfering access can cause problems. In particular, if the commit operation is only partially complete, it is possible to leave the processor in an inconsistent state, with only a portion of the transactional updates committed. One way to solve this problem is to delay interfering data accesses until the commit operation completes. This delaying technique is described in more detail below with reference to FIGS. 12–13. (Note that an interfering access from another process can include a cache-coherence signal, such as a request-to-own (RTO) signal or a request-to-share (RTS) signal.)

State Information

Figure 12:
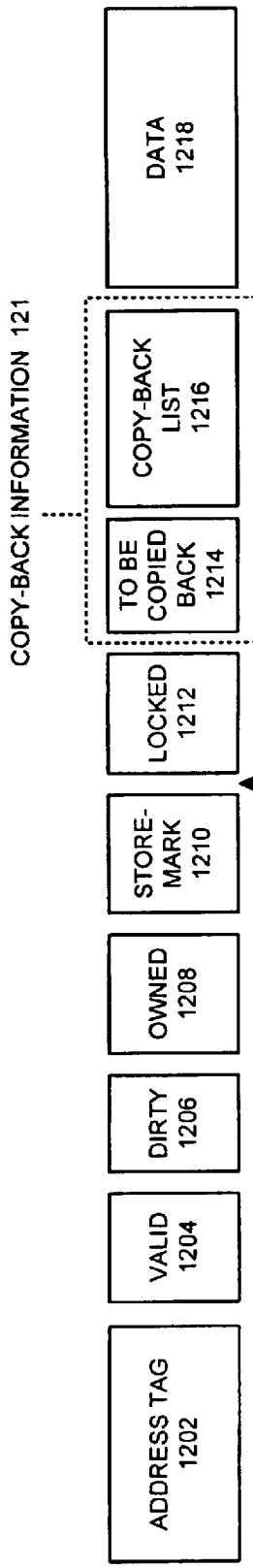
FIG. 12 illustrates various items of state information associated with an L2 cache line in accordance with an embodiment of the present invention.

FIG. 12 illustrates various items of state information associated with an L2 cache line in accordance with an embodiment of the present invention. Much of this state information is standard for cache lines in a cache-coherent computer system. In particular, the cache line illustrated in FIG. 12 includes data 1218 and address tag field 1201, as well as state bits associated with cache coherence operations, including valid bit 1204, dirty bit 1206 and owned bit 1208.

In addition to this standard state information, the system maintains a store-mark bit 1210, which indicates that the cache line was written to during transactional execution, and that at least one corresponding store buffer entry is waiting to be committed to the cache line. The system also maintains a locked bit 1212, which indicates that the cache line is to remain locked in cache during the commit operation until the corresponding store buffer entry (or entries) are committed to the cache line. (Note that it may be possible to combine store-mark bit 1210 and locked bit 1212 into a single same bit.) In one embodiment of the present invention, the system also maintains a thread ID 1211, which indicates which thread has locked (or has store-marked) the cache line.

The system can also maintain copy-back information for the cache line, including a "to be copied back bit" 1214, which indicates whether the cache line has to be copied back to another thread. It also includes a copy back list 1216, which identifies where the cache line has to be copied back to. In one embodiment of the present invention, copy-back list 1216 is a one-hot bit vector, wherein each bit indicates whether the cache line has to be copied back to a specific thread (or processor).

Note that there are many alternative ways to encode the state information illustrated in FIG. 12. For example, in one embodiment of the present invention, the system encodes the state information illustrated in FIG. 12 using a more dense encoding into fewer bits.

Process of Delaying an Interfering Access

Figure 13:
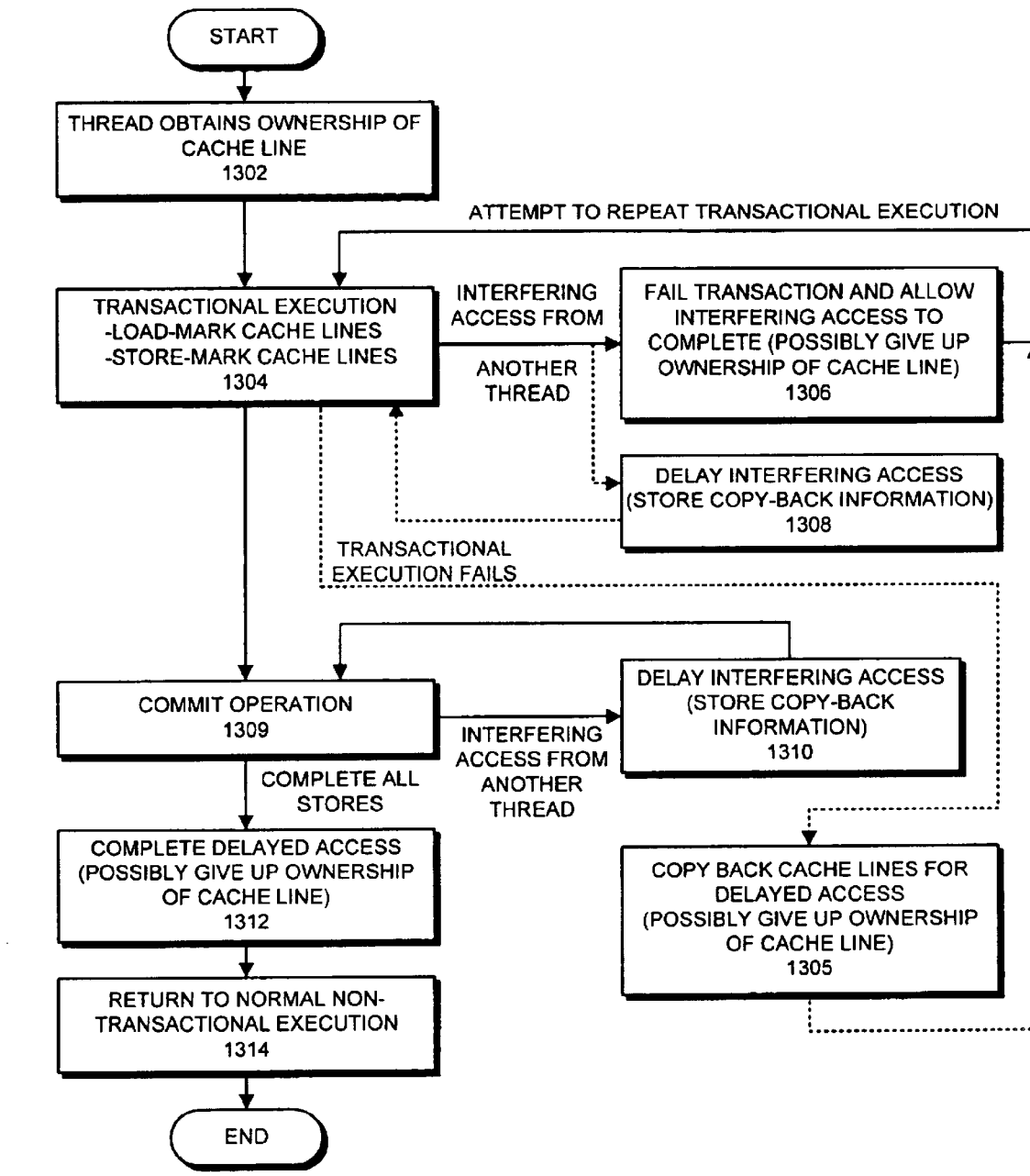
FIG. 13 presents a flow chart illustrating how interfering accesses are delayed during transactional program execution in accordance with an embodiment of the present invention.

FIG. 13 presents a flow chart illustrating how interfering accesses are delayed during transactional program execution in accordance with an embodiment of the present invention. During operation, the system obtains ownership of a cache line in L2 cache 120 (step 1302). Shared ownership is sufficient for cache lines that are only read while exclusive ownership is necessary for caches lines stored to. Next, during subsequent transactional program execution, the system load-marks cache lines in L1 cache and store marks cache lines in L2 cache as described above (step 1304).

If an interfering access from another process is encountered during transactional execution, the system fails the transaction as described above and possibly gives up ownership of the cache line (step 1306). The system then returns to step 1304 and attempts to repeat the failed transactional execution.

In an alternative embodiment of the present invention (indicated by the dashed line), instead of failing the transaction, the system delays the interfering access and stores copy back information to enable the interfering access to complete at a later time (step 1308). Note that if the interfering access is a store to a load-marked cache line, the interfering access can complete as soon as the commit operation begins, without having to wait for stores to be committed to the architectural state of the processor. Otherwise, in the case of a load or a store to a store-marked cache line, the system has to wait until after the last update to the cache line during the transactional execution is committed to the architectural state of the processor before completing the interfering access. (Note that a load from a load-marked cache line does not interfere with transactional program execution.)

In this alternative embodiment, if transactional execution for some reason fails, the system copies back cache lines for any interfering accesses that have been delayed during transactional execution (step 1305). In doing so, the system copies back original cache line data, which has not been modified during the transactional execution. Next, the system returns to step 1304 and attempts to repeat the filed transactional execution.

After transactional execution completes, the system performs a commit operation (step 1309). During this commit operation, stores that took place during transactional execution are drained from the store buffer to the L2 cache (which represents the architectural state of the processor). If an interfering access from another process is encountered during the commit operation, the system delays the interfering access and stores copy back information to enable the interfering access to complete at a later time (step 1310). (While delaying this access, the system can possibly acknowledge ownership of the cache line as part of a cache coherence protocol and can delay performing a copy-back operation, or equivalent operation that gives up ownership, for the cache line.) The system then returns to step 1309 to complete the commit operation.

After all stores are all committed, the system can complete all delayed accesses and can perform copy-back operations as necessary (step 1312). The system can also give up ownership of the corresponding cache lines if necessary. Next, the system then returns to normal non-transactional execution (step 1314).

Note that it is not necessary to wait until all stores are committed before performing the copy-back operations, or equivalent operations that gives up ownership. In one embodiment of the present invention, a given cache line is copied back to requesting threads after the last update to the given cache line that took place during the transactional execution is committed to the architectural state of the processor.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for delaying memory accesses directed to cache lines associated with transactional execution, comprising:

commencing transactional execution of a block of instructions within a thread executing on a processor;

receiving a request from a requesting thread to perform a memory access involving a cache line, wherein performing the memory access involves copying the cache line back to the requesting thread;

wherein if performing the memory access on the cache line will interfere with the transactional execution and if it is possible to delay the memory access, the method further comprises, storing copy-back information for the cache line to enable the cache line to be copied back to the requesting thread, and performing the memory access and copying the cache line back to the requesting thread at a later time when the memory access will not interfere with the transactional execution.

2. The method of claim 1, wherein it is possible to delay an interfering memory access if a commit operation is in the process of committing updates made during the transactional execution to the architectural state of the processor, and if the memory access is directed to a cache line for which a last update made during the transactional execution has not yet been committed to the architectural state of the processor.

3. The method of claim 2, wherein a cache line associated with a delayed memory access is copied back to the requesting thread after the last update to the cache line during the transactional execution is committed to the architectural state of the processor.

4. The method of claim 2, wherein a cache line associated with a delayed memory access is copied back to the requesting thread after all updates that took place during the transactional execution are committed to the architectural state of the processor.

5. The method of claim 2, wherein it is possible to delay an interfering memory access prior to the commit operation; and
wherein if the transactional execution fails prior to the commit operation, the method further involves copying back cache lines for any interfering memory accesses that have been delayed during the transactional execution, wherein the data that is copied back is original cache line data, which has not been modified during the transactional execution.

6. The method of claim 1, wherein if the memory access will interfere with the transactional execution and if it is not possible to delay the memory access, the method further comprises:
discarding changes made during the transactional execution;
allowing the memory access to complete; and
attempting to re-execute the block of instructions.

7. The method of claim 6, wherein discarding changes made during transactional execution involves:
discarding register file changes made during the transactional execution;
clearing load marks from cache lines;
draining store buffer entries generated during the transactional execution; and
clearing store marks from cache lines.

8. The method of claim 1, wherein an interfering memory access can include:
a store by another thread to a cache line that has been load-marked by the thread; and
a load or a store by another thread to a cache line that has been store-marked by the thread.

9. The method of claim 1, wherein commencing transactional execution involves:
saving processor registers;
configuring the processor to load-mark cache lines during loads that take place during transactional execution;
configuring the processor to store-mark cache lines during stores that take place during transactional execution; and
configuring the processor to continually monitor data references from other threads to detect interfering data references.

10. The method of claim 1, wherein if transactional execution completes without encountering an interfering memory access from another thread, the method further comprises:

committing changes made during the transactional execution to the architectural state of the processor; and
resuming normal non-transactional execution of the program past the block of instructions.

11. The method of claim 10, wherein committing changes made during transactional execution involves:
clearing load marks from cache lines;
committing store buffer entries generated during the transactional execution to memory;
wherein if a store buffer entry contains a last update made to a cache line made during the transactional execution, committing the store buffer entry involves unmarking the corresponding cache line; and
committing register file changes made during transactional execution.

12. The method of claim 1, wherein the request to perform the memory access can include:
a request-to-own (RTO) signal; or
a request-to-share (RTS) signal.

13. An apparatus that facilitates delaying memory accesses directed to cache lines associated with transactional execution, comprising:
a transactional execution mechanism configured to commence transactional execution of a block of instructions within a thread executing on a processor;
a request processing mechanism configured to receive a request from a requesting thread to perform a memory access involving a cache line, wherein performing the memory access involves copying the cache line back to the requesting thread;
wherein if performing the memory access on the cache line will interfere with the transactional execution and if it is possible to delay the memory access, the request processing mechanism is configured to,
store copy-back information for the cache line to enable the cache line to be copied back to the requesting thread, and to
perform the memory access and copy the cache line back to the requesting thread at a later time when the memory access will not interfere with the transactional execution.

14. The apparatus of claim 13, wherein it is possible to delay an interfering memory access if a commit operation is in the process of committing updates made during the transactional execution to the architectural state of the processor, and if the memory access is directed to a cache line for which a last update made during the transactional execution has not yet been committed to the architectural state of the processor.

15. The apparatus of claim 14, wherein the request processing mechanism is configured to copy back a cache line associated with a delayed memory access to the requesting thread after the last update to the cache line during the transactional execution is committed to the architectural state of the processor.

16. The apparatus of claim 14, wherein the request processing mechanism is configured to copy back a cache line associated with a delayed memory access to the requesting thread after all updates that took place during the transactional execution are committed to the architectural state of the processor.

17. The apparatus of claim 14, wherein it is possible to delay an interfering memory access prior to the commit operation; and
wherein if the transactional execution fails prior to the commit operation, the request processing mechanism is configured to copy back cache lines for any interfering memory accesses that have been delayed during the transactional execution, wherein the data that is copied back is original cache line data, which has not been modified during the transactional execution.

18. The apparatus of claim 13, wherein if the memory access will interfere with the transactional execution and if it is not possible to delay the memory access, the transactional execution mechanism is configured to:

discard changes made during the transactional execution;

allow the memory access to complete; and to attempt to re-execute the block of instructions.

19. The apparatus of claim 18, wherein while discarding changes made during the transactional execution, the transactional execution mechanism is configured to:

discard register file changes made during the transactional execution;

clear load marks from cache lines;

drain store buffer entries generated during the transactional execution; and to clear store marks from cache lines.

20. The apparatus of claim 13, wherein an interfering memory access can include:

a store by another thread to a cache line that has been load-marked by the thread; and a load or a store by another thread to a cache line that has been store-marked by the thread.

21. The apparatus of claim 13, wherein while commencing transactional execution, the transactional execution mechanism is configured to:

save processor registers;

configure the processor to load-mark cache lines during loads that take place during transactional execution;

configure the processor to store-mark cache lines during stores that take place during transactional execution; and to configure the processor to continually monitor data references from other threads to detect interfering data references.

22. The apparatus of claim 13, wherein if transactional execution completes without encountering an interfering memory access from another thread, the transactional processing mechanism is configured to:

commit changes made during the transactional execution to the architectural state of the processor; and to resume normal non-transactional execution of the program past the block of instructions.

23. The apparatus of claim 22, wherein while committing changes made during transactional execution, the transactional processing mechanism is configured to:

clear load marks from cache lines;

commit store buffer entries generated during the transactional execution to memory, wherein if a store buffer entry contains a last update made to a cache line during the transactional execution, committing the store buffer entry involves unmarking the corresponding cache line; and to commit register file changes made during transactional execution.

24. The apparatus of claim 13, wherein the request to perform the memory access can include:

a request-to-own (RTO) signal; or a request-to-share (RTS) signal.

25. An computer system that facilitates delaying memory accesses directed to cache lines associated with transactional execution, comprising:

a processor;

a memory;

a transactional execution mechanism within the processor configured to commence transactional execution of a block of instructions within a thread executing on a processor;

a request processing mechanism within the processor configured to receive a request from a requesting thread to perform a memory access involving a cache line, wherein performing the memory access involves copying the cache line back to the requesting thread;

wherein if performing the memory access on the cache line will interfere with the transactional execution and if it is possible to delay the memory access, the request processing mechanism is configured to, store copy-back information for the cache line to enable the cache line to be copied back to the requesting thread, and to perform the memory access and copy the cache line back to the requesting thread at a later time when the memory access will not interfere with the transactional execution.

* * * * *